(12) United States Patent
Mizutani et al.

(10) Patent No.: US 6,827,953 B1
(45) Date of Patent: Dec. 7, 2004

(54) COMPOSITIONS COMPRISING SACCHAROMYCES CEREVISIAE AND LACTIC ACID BACTERIA

(75) Inventors: Takeo Mizutani, 1-6-19, Nishihara-cho, Tanashi-shi, Tokyo 188-0004 (JP); Ryouichi Shin, Tokyo (JP); Momoyo Suzuki, Tokyo (JP); Kazushi Miura, Tokyo (JP)

(73) Assignees: Riken (JP); A.L.A. Corporation (JP); Takeo Mizutani (JP)

(*) Notice: Subject to any disclaimer, the term of this patent is extended or adjusted under 35 U.S.C. 154(b) by 0 days.

(21) Appl. No.: 09/402,505

(22) PCT Filed: Feb. 4, 1999

(86) PCT No.: PCT/JP99/00480

§ 371 (c)(1),
(2), (4) Date: Oct. 4, 1999

(87) PCT Pub. No.: WO99/40178

PCT Pub. Date: Aug. 12, 1999

(30) Foreign Application Priority Data

Feb. 5, 1998 (JP) .......................................... 10/024892

(51) Int. Cl.[7] ........................ A61K 35/72; A61K 35/74; C12N 1/20

(52) U.S. Cl. ........................ 426/62; 424/114; 424/780; 435/252.4

(58) Field of Search ........................ 435/252.4, 252.9, 435/253.4, 255.2; 426/2, 61, 62, 655; 424/93.44, 93.45, 93.51, 520, 115, 114, 195.16, 780

(56) References Cited

U.S. PATENT DOCUMENTS 5,108,766 A    4/1992  Gelinas et al. ................ 426/43
5,965,178 A  * 10/1999  Baensch et al. ............... 426/52
6,284,243 B1 *  9/2001  Masuyama et al. ......... 424/93.45

FOREIGN PATENT DOCUMENTS

| EP | 0 298 605 A |   | 1/1989 |
| EP | 0 339 750 A |   | 11/1989 |
| EP | 0818529 A1 |   | 1/1998 |
| FR | 2-718751 | * | 10/1995 |
| JP | 3-505158 |   | 11/1991 |
| JP | 8-298982 | * | 11/1996 |
| JP | 09-075066 |   | 3/1997 |
| JP | 9-238647 | * | 9/1997 |
| JP | 10-057031 |   | 3/1998 |
| PH | 29583 | * | 4/1996 |
| WO | WO 98/42194 A |   | 10/1998 |

OTHER PUBLICATIONS

*ATCC Catalogue of Bacteria and Phages*, p. 169–177, 1992.*

* cited by examiner

Primary Examiner—Keith Hendricks
(74) Attorney, Agent, or Firm—Fish & Richardson P.C.

(57) ABSTRACT

The present invention provides a composition comprising an untreated or treated culture of a mixed microorganism and a functional food comprising said composition. A composition comprising an untreated or treated culture of a mixed microorganism comprising at least three lactic acid bacteria selected from the group consisting of *Lactobacillus delbrueckii*, *Lactobacillus acidophilus*, *Lactobacillus plantarum*, *Lactobacillus fermentum*, *Lactobacillus casei*, *Lactobacillus rhamnosus*, *Lactococcus lactis* and *Streptococcus thermophilus*, mixed with *Saccharomyces cerevisiae*, and a functional food comprising said composition.

14 Claims, 8 Drawing Sheets

COMPOSITIONS COMPRISING SACCHAROMYCES CEREVISIAE AND LACTIC ACID BACTERIA

RELATED APPLICATIONS

The present application claims benefit of priority of Patent Convention Treaty (PCT) International Application Serial No:PCT/JP99/00480, filed Feb. 4, 1999, which claims benefit of priority to JP 1998 24892, filed Feb. 5, 1998. Each of the aforementioned applications are explicitly incorporated herein by reference in their entirety and for all purposes.

TECHNICAL FILED

The present invention relates to a composition comprising an untreated or treated culture of lactic acid bacteria mixed with a yeast, and to a functional food comprising said composition.

BACKGROUND ART

Fermented foods comprising lactic acid bacteria have been expected to prevent adult's diseases and promote health. Such foods are typified by fermented milk (yoghurt); in addition, lactic acid bacteria beverage and sour milk have been well popularized.

Many reports have been made on physiological activities of lactic acid bacteria and fermented foods; therefore, they are expected to be utilized as healthy foods.

In most of brewed foods including sake, bean paste (miso) and soybean sauce, it has been known that unique flavor and taste and components are generated by symbiotic or antagonistic actions between several microorganisms co-cultured in media. However, few of lactic acid bacteria or fermented foods thereof are produced by so-called cocultivation and physiological activities of the bacteria have not been known.

DISCLOSURE OF THE INVENTION

It is an object of the present invention to provide a composition comprising an untreated or treated culture of lactic acid bacteria mixed with a yeast, and to a functional food comprising said composition.

The present inventors have made great efforts to solve the above mentioned problem and found that a culture of lactic acid bacteria mixed with a yeast or a treated material thereof exhibits various functions. Thus, the present invention has been completed.

Accordingly, the present invention provides a composition comprising an untreated or treated culture of at least three lactic acid bacteria selected from the group consisting of *Lactobacillus delbrueckii, Lactobacillus acidophilus, Lactobacillus plantarum, Lactobacillus fermentum, Lactobacillus casei, Lactobacillus rhamnosus, Lactococcus lactis* and *Streptococcus thermophilus*, which are mixed with *Saccharomyces cerevisiae*. The mixed microorganisms used in the present invention include *Lactobacillus delbrueckii, Lactobacillus casei, Lactococcus lactis* and *Saccharomyces cerevisiae; Lactobacillus acidophilus, Lactobacillus rhamnosus, Lactococcus lactis* and *Saccharomyces cerevisiae; Lactobacillus plantarum, Lactobacillus casei, Streptococcus thermophilus* and *Saccharomyces cerevisiae*; as well as *Lactobacillus fermentum, Lactobacillus rhamnosus, Streptococcus thermophilus* and *Saccharomyces cerevisiae*.

Further, the present invention provides a functional food comprising said composition. This specification includes part or all of the contents as disclosed in the specification and/or drawings of Japanese Patent Application No. JP 98/24892, which is a priority document of the present application.

Hereinafter the present invention will be described in detail.

The composition of the present invention comprises a culture obtained by culturing (co-cultivating) a mixed microorganism comprising lactic acid bacteria and yeast, or a treated material thereof.

Lactic acid bacteria include those belonging to the genus Lactobacillus, Lactococcus or Streptococcus, such as *Lactobacillus delbrueckii, Lactobacillus acidophilus, Lactobacillus plantarum, Lactobacillus fermentum, Lactobacillus casei, Lactobacillus rhamnosus, Lactococcus lactis* and *Streptococcus thermophilus*.

Yeast includes *Saccharomyces cerevisiae*.

Said microorganisms used may be generally commercially available; they are not limited to particular strains of said microorganisms provided that an untreated or treated co-culture of these microorganisms can be utilized as functional foods. For example, lactic acid bacteria belonging to the genus Lactobacillus include *Lactobacillus delbrueckii* strain ALAL007, *Lactobacillus acidophilus* strain ALAL005, *Lactobacillus plantarum* strain ALAL006, *Lactobacillus fermentum* strains ALAL001 and JCM1173, *Lactobacillus casei* strains ALAL002, ALAL003 and JCM1053, and *Lactobacillus rhamnosus* strains ALAL004, ALAL010 and JCM1136; lactic acid bacteria belonging to the genus Lactococcus include *Lactococcus lactis* subsp. hordniae strains ALAL008 and ALAL009; lactic acid bacteria belonging to the genus Streptococcus include *Streptococcus thermophilus* strains ALAL011 and ALAL012; and yeast includes for example *Saccharomyces cerevisiae* strains JCM1499, ALAY001, ALAY002, ALAY003 and ALAY004.

*Saccharomyces cerevisiae* strain ALAY001, *Lactobacillus fermentum* strain ALAL001, *Lactobacillus casei* strain ALAL003, and *Lactobacillus rhamnosus* strain ALAL004 have been deposited under the Budapest Treaty on Nov. 28, 1997 with National Institute of Bioscience and Human-Technology, Agency of Industrial Science and Technology (1-3 Higashi 1-chome, Tsukuba-shi, Ibaraki, 305-0046, Japan) under Accession Nos. FERM BP-6626, 6627, 6628 and 6629, respectively.

According to the present invention, the mixed microorganism consists of at least three arbitrarily selected lactic acid bacteria and one yeast. For example, the combination of the microorganisms may be any of the group A to D as set forth in Table 1.

TABLE 1

| | Lactic acid bacteria | | | |
|---|---|---|---|---|
| group | (1) | (2) | (3) | Yeast |
| A | L. delbrueckii subsp. bulgaricus | L. casei | Lactococcus lactis subsp. hordniae | S. cerevisiae |
| B | L. acidophilus | L. rhamnosus | Lactococcus lactis subsp. hordniae | S. cerevisiae |
| C | L. plantarum | L. casei | Streptococcus thermophilus | S. cerevisiae |
| D | L. fermentum | L. rhamnosus | Streptococcus thermophilus | S. cerevisiae |

Any of the Groups A to D may be used alone (4 strains of microorganisms); or two or more groups may be combined.

If microorganisms of the same species are included in two or more groups to be combined and used (for example, L. casei and S. cerevisiae are overlapped when Groups A and C are to be combined), different strains of the same species should be used.

The composition of the present invention may be obtained by cultivating the mixed microorganism comprising lactic acid bacteria and yeast in a medium containing hot water extract of soybean.

The medium comprises hot water extract of soybean. After mixing $1\times10^5$ to $1\times10^6$ of each of lactic acid bacteria per ml with $1\times10^4$ to $1\times10^6$ of a yeast per ml, the mixed microorganism is inoculated in the medium and cultivated at 20 to 37° C. for 4 to 10 days.

When a plurality of microorganisms from different Groups are to be combined, each of the Groups to be combined is cultivated under the above described conditions and then mixed with each other followed by cultivating under the above described conditions.

After cultivation, the culture is boiled at 80° C. to sterilize and recovered.

The composition of the present invention may be obtained by freeze— or spray-drying the culture. Alternatively, the culture may be treated by filtration or centrifugation or otherwise to separate the supernatant from the cells. In this case, the supernatant and cells may also be freeze— or spray-dried to prepare each a composition of the present invention.

The composition of the present invention may be in any form and can be processed into a liquid, solid, granule or the like. A granular form is preferred since it may be conveniently handled.

When processed into a granule, it is included in a polysaccharide such as cyclodextrin.

The composition of the present invention obtained in the above manner have various activities and, therefore, may be used as a healthy food having some function (functional food). Such activities include, for example, liver and kidney function improving activity, anti-mutagenic activity, tumor cell growth inhibiting activity, and enteric bacterial flora improving activity.

When in a granular form as usual, the composition of the present invention may be used as a functional food by eating in the granular form or adding an appropriate amount thereof to a food.

Foods include, but not limited to, for example, cakes such as jellies and candies, beverages such as juices, teas and nutritional drinks, and rice.

The amount and rate of the composition of the present invention added to a food may be adjusted as appropriate depending upon preference and usually 0.1 to 1% by weight per food.

BEST MODE FOR CARRYING OUT THE INVENTION

Figure 1A:
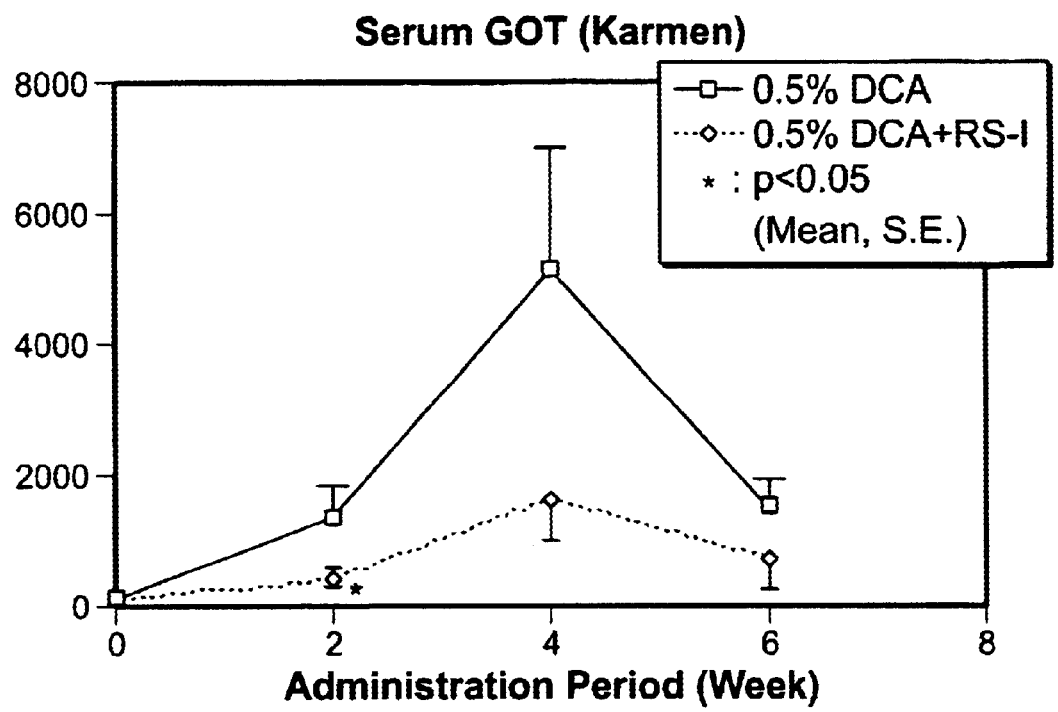
FIG. 1 shows the liver function improving activity of the composition according to the present invention.

The present invention will be illustrated in more detail by the following examples. However, the scope of the present invention is not limited to these examples.

Example 1

Preparation of Composition

Eight (8) species, 12 strains of lactic acid bacteria and one species, 4 strains of yeast were divided into 4 groups (Groups A to D) as shown in Table 2.

TABLE 2

| group | Lactic acid bacteria (1) | (2) | (3) | Yeast |
|---|---|---|---|---|
| A | L. delbrueckii subsp. bulgaricus ALAL007 | L. casei ALAL003 | Lactococcus lactis subsp. hordniae ALAL008 | S. cerevisiae ALAY003 |
| B | L. acidophilus ALAL005 | L. rhamnosus ALAL004 | Lactococcus lactis subsp. hordniae ALAL009 | S. cerevisiae ALAY004 |
| C | L. plantarum ALAL006 | L. casei ALAL002 | Streptococcus thermophilus ALAL011 | S. cerevisiae ALAY001 |
| D | L. fermentum ALAL001 | L. rhamnosus ALAL010 | Streptococcus thermophilus ALAL012 | S. cerevisiae ALAY002 |

For each Group, a preculture containing four respective strains was inoculated to hot water extract of soybean (each lactic acid bacterium: $1\times10^5$ to $1\times10^6$/ml; yeast: $1\times10^4$ to $1\times10^5$/ml) and cultivated at 20 to 37° C. for 5 to 10 days.

Each culture was mixed into a fresh medium and further cultivated at 20 to 37° C. for 2 to 5 days. After cultivation, the culture was heated to sterilize and freeze-dried to yield 90 g of a dried product per liter. On the other hand, the culture was filtered and the supernatant was freeze-dried to yield 40 g of a dried product per liter.

Among the compositions thus obtained, those obtained from the culture per se and those from the supernatant were designated as RS-II and RS-I, respectively.

Example 2

Liver Function Improving Activity Test (Effect on bile acid loaded hepatopathic rat)

Deoxycholic acid, hereinafter referred to as DCA, is a representative secondary bile acid excreted from cholic acid by enteric bacteria. DCA is highly toxic and is known to cause cholestatic hepatopathy in experimental animals. In addition, it is also reported that DCA may be responsible for acute pancreatitis and colic cancer.

The amount and composition of bile acid in the blood and bile may vary with one's eating habitude and physiological state; for example, it has been known that the amount of DCA in the bile is significantly increased in diabetic patients and experimental diabetic model animals. The effects on living bodies are important.

Accordingly, to investigate the effect of the composition of the present invention on hepatopathy, DCA was used to induce hepatopathy.

(1) Method

Wistar male rats of 5 weeks old were purchased from Charles River and pre-bred in a well air-conditioned breeding room with a controlled room temperature 23±1° C., humidity 50±5%, photoperiod cycle (12 h light/12 h dark) for 1 week. At 6 weeks old, the rats were divided into two groups of 6 rats each such that the mean and variation of body weights in each group were substantially identical with each other, one group constituting a group to which the composition of the present invention was administered and the other a control group. The administration group was given MF powdery feed (Oriental Yeast Co., Ltd.) containing 0.5% DCA and 5% RS-I while the control group was given MF powdery feed containing 0.5% DCA only. These feeds were freely taken by rats of both groups together with tap water for 6 weeks.

At 0, 2, 4 and 6 weeks from the start of administration, the blood was taken from the tail vein and the serum was separated. The values of Glutamic-Oxaloacetic transaminase (GOT), Glutamic-pyruvic transaminase (GPT), Blood urea nitrogen (BUN), Uric acid (UA) and Cholesterol (CHL) were measured. At 5 weeks of administration, a metabolic cage was used to measure the amount of urine and the concentration of electrolytes in the urine. After administration, the rat was sacrificed and dissected. The weights of organs were measured and the serum was separated from the taken blood to analyze serum biochemical properties.

(2) Results

Figure 1B:
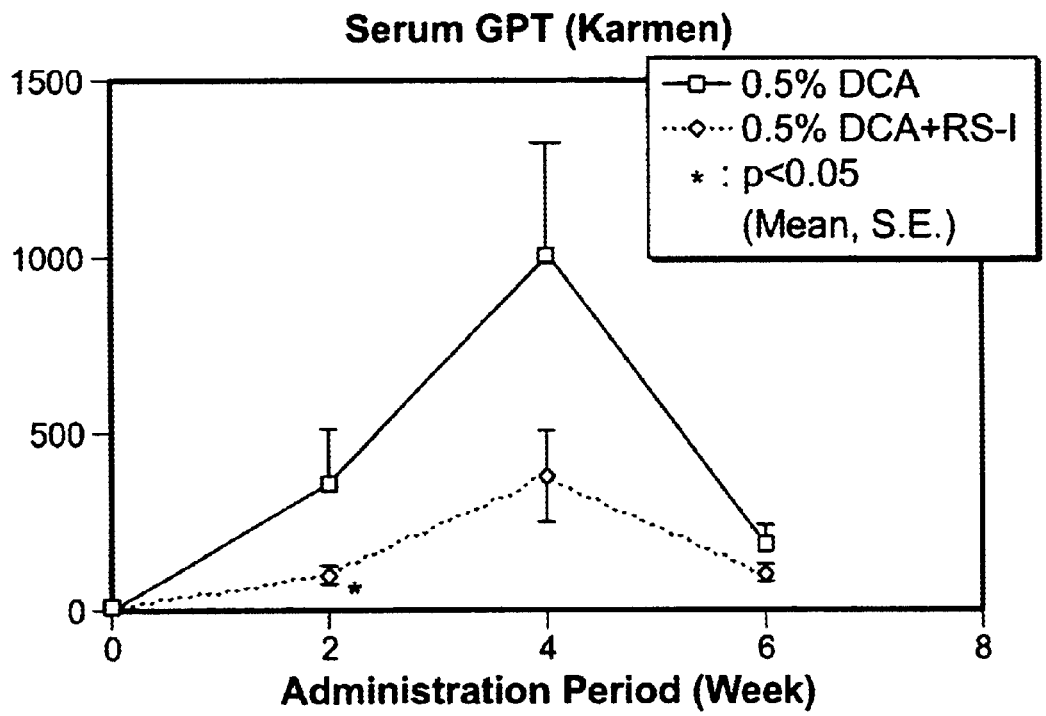

Upon load of DCA, the rat serum GOT activity rapidly increased. In the control group, the activity increased to 1366±467 (Karmen) at 2 weeks and 5122±1848 (Karmen) as shown in FIG. 1A. On the contrary, it was 406±88 (Karmen) at 2 weeks in the RS-I administered group; thus, the increase of GOT activity was inhibited significantly ($p<0.05$). Even at 4 weeks, it was 1636±630 (Karmen), indicating that the increase of GOT activity tended to be inhibited (FIG. 1A). It was also observed, on the other hand, that the increase of serum GPT activity was inhibited as in the GOT activity (FIG. 1B).

Figure 2:
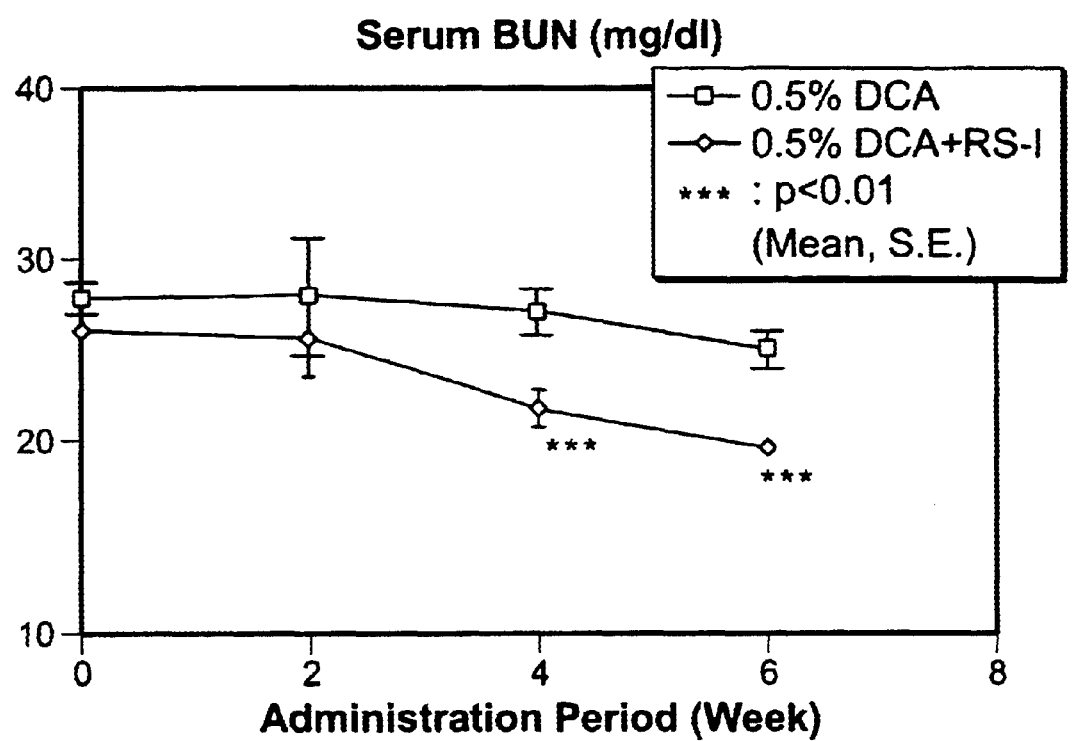
FIG. 2 shows the kidney function improving activity of the composition according to the present invention.

For the BUN values, the RS-I administered group showed significantly ($p<0.01$) lower values at 4 and 6 weeks as compared with the control group (FIG. 2). No effect of RS-I administration on UA and CHL values was observed.

Figure 3A:
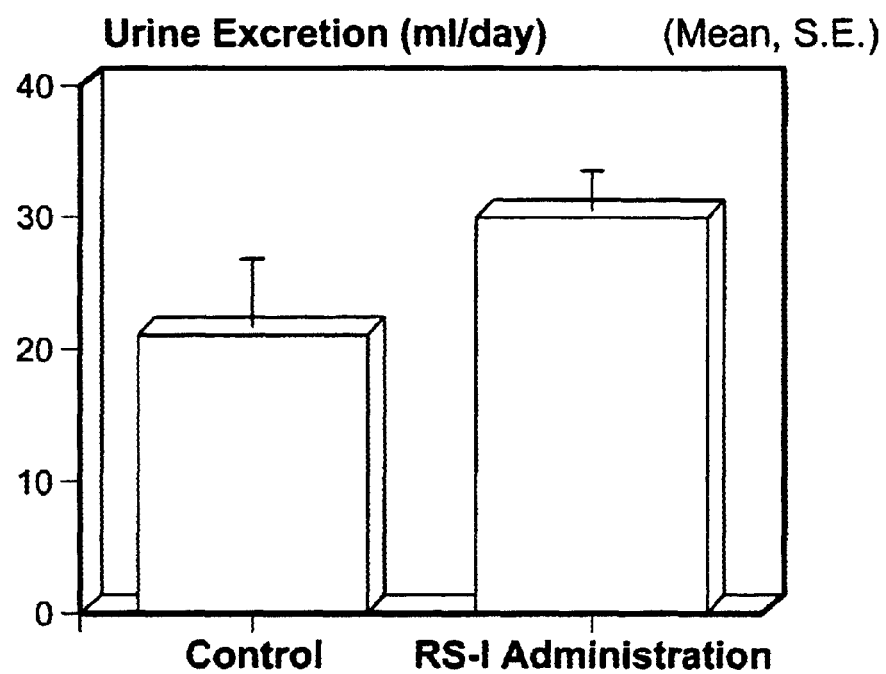
FIG. 3 shows the kidney function improving activity of the composition according to the present invention.
Figure 3B:
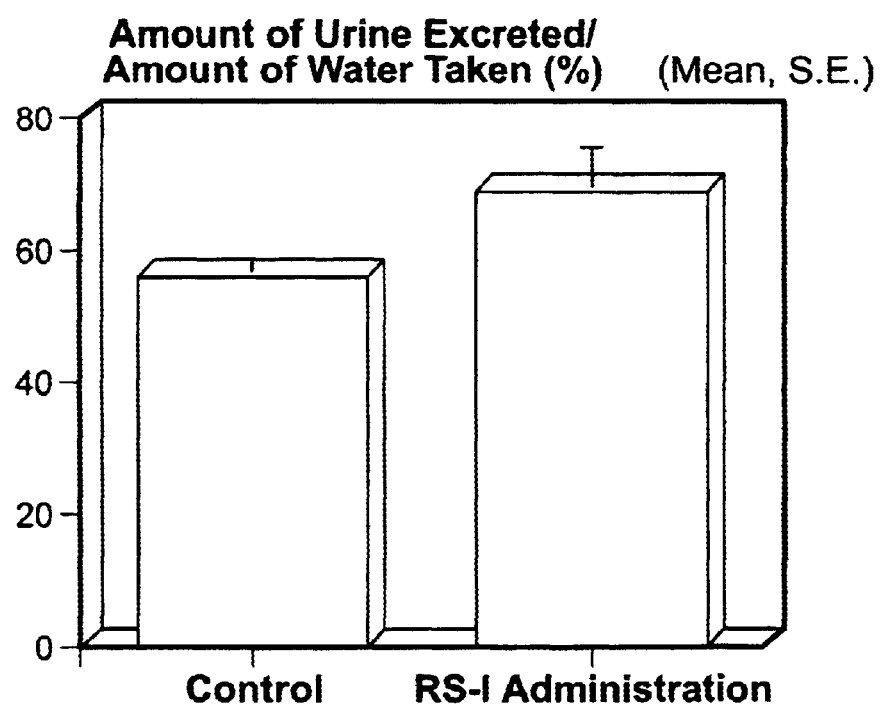

The RS-I administered group tended to show larger amounts of urine excreted at 5 weeks (FIG. 3A) and also larger proportions of excretion to the amount of water taken (FIG. 3B).

Figure 4A:
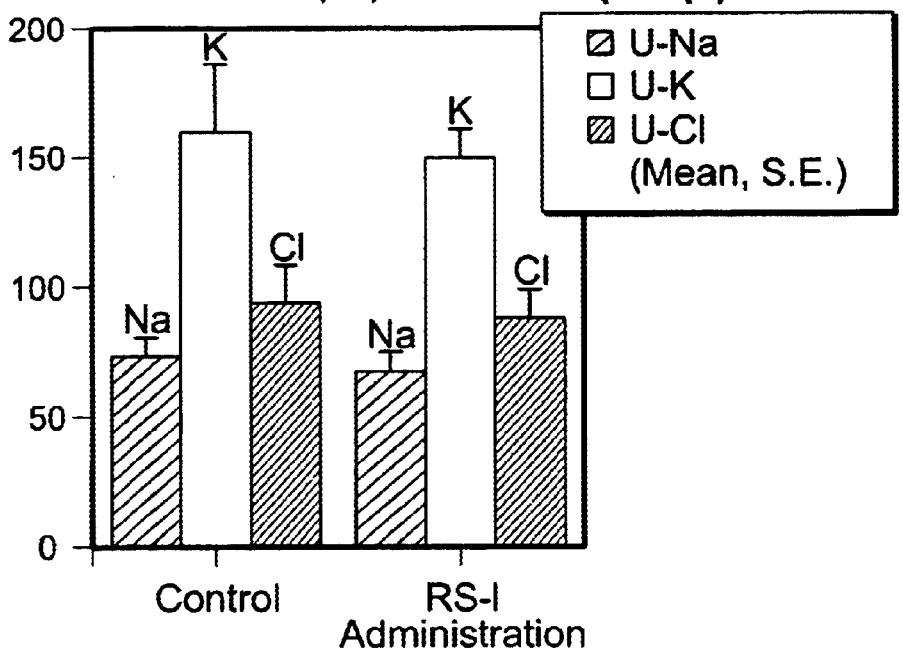
FIG. 4 shows the kidney function improving activity of the composition according to the present invention.
Figure 4B:
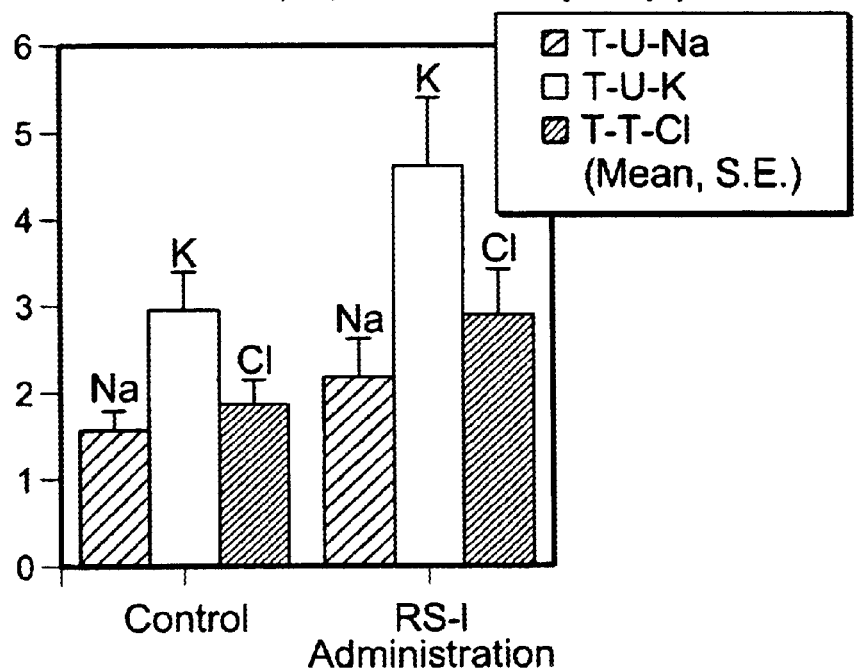

There was no difference in the concentration of electrolytes in the urine between the RS-I administered and control group; in the control group, the amount of urine was larger and therefore the amount of electrolytes excreted was larger (FIG. 4).

According to the biochemical analysis of the sera after administration of DCA, no change due to the administration of RS-I was observed in the values of Total protein (TP), Alkaline phosphatase (ALP), γ-Glutamyl transpeptidase (γ-GTP), Leucine aminopeptidase (LAP), Glucose (GLU), Total cholesterol (T-CHL), Lipid Peroxide (LPO), β-Lipoprotein (β-LP) and bilirubin. However, the concentration of total bile acid in the sera was 81±36 (nmol/ml) in the control group and 46±34 (nmol/ml) in the RS-I administered group; thus, the RS-I administered group tended to show lower concentration of total bile acid in sera as compared with the control group.

The RS-I administration showed a tendency to inhibit the increase of serum GOT and GPT activities caused by DCA loading and, therefore, RS-I was shown to be useful for improving damage on liver function.

Further, RS-I administration lowered the serum BUN values and increased the amount of urine excreted; accordingly, RS-I was found to have an activity to improve the damage on kidney function.

Example 3

Effect on Galactosamine Hepatopathic Rat

In this example, the effect of RS-I administration on hepatopathy which has a different mechanism from the DCA induced model of Example 1 was investigated.

(1) Method

Wistar male rats of 5 weeks old were purchased from Charles River and pre-bred in a well air-conditioned breeding room with a controlled room temperature 23±1° C., humidity 50±5%, photoperiod cycle (12 h light/12 h dark) for 1 week. At 6 weeks old, the rats were divided into two groups of 6 rats each such that the mean and variation of body weights in each group were substantially identical with each other, one group constituting a group to which the composition of the present invention was administered and the other a control group. The administration group was given MF powdery feed containing 5% RS-I while the control group was given MF powdery feed only. These feeds were freely taken by rats of both groups together with tap water for 3 weeks.

At 3 weeks from the RS-I feed loading, about 1 ml of an aqueous solution of D-galactosamine hydrochloride was intraperitoneally injected, said solution having been prepared so that 500 mg of D-galactosamine hydrochloride was administered per kg of body weight of rat. At 1, 2, 3 and 6 days from the galactosamine administration, the blood was taken from the tail vein and serum GOT, CHL, GLU and BUN values were measured.

(2) Results

Figure 5:
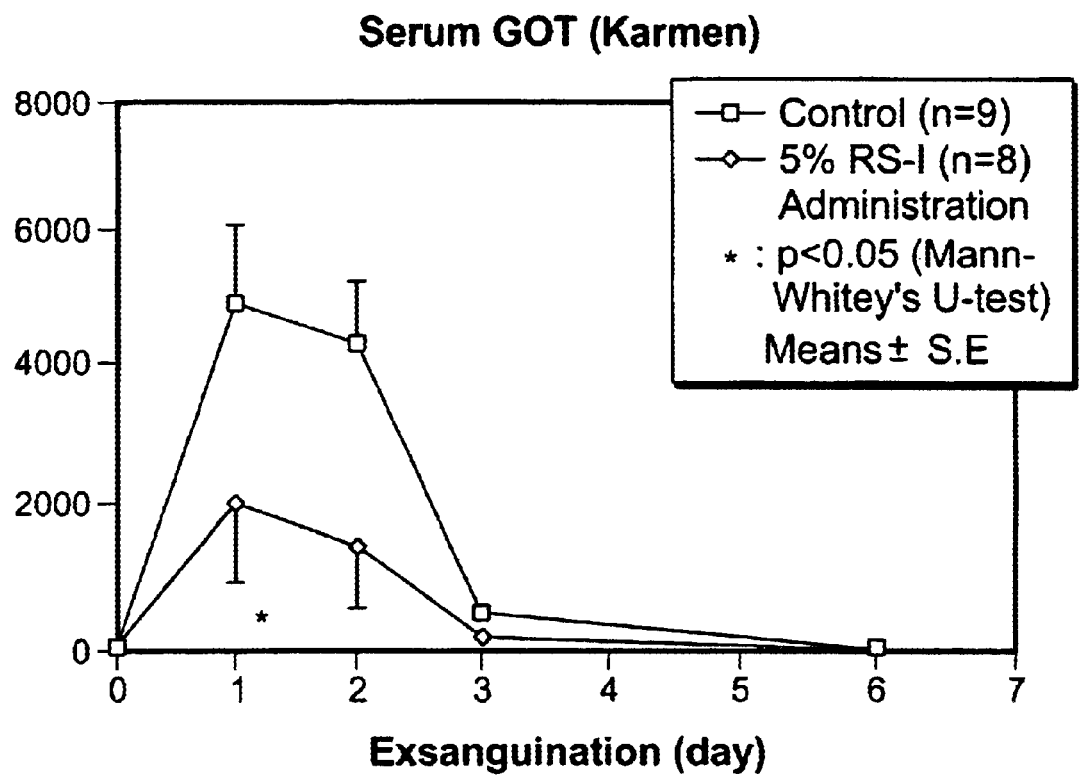
FIG. 5 shows the liver function improving activity of the composition according to the present invention.

After administration of galactosamine, rat serum GOT rapidly increased. At 1 day, the serum GOT value increased 5148±1711 (Karmen) in the control group (FIG. 5) while it was 2244±1241 (Karment) in the RS-I administration group. Thus, the administration of RS-I significantly ($p<0.05$) inhibited the increase of GOT activity due to galactosamine (FIG. 5). There was not observed any effects of RS-I administration on the serum CHL, GLU and BUN values.

Example 4

Effect on DMH Colic Cancerized Mice

In this example, dimethylhydrazine (DMH) induced colic cancerized mice were used to carry out the following experiments concerning the carcinogenesis inhibiting effect of the composition of the present invention.

(I) Method

CF#1 mice, the line of which was maintained in Institute of Physical and Chemical Research, were mated and 60 male mice were bred. The mice of this line are highly sensitive to DMH and colic polyps are specifically induced. The breeding was carried out at a temperature of 23±1° C., a humidity of 50±5% and an photoperiod cycle (12 h light/12 h dark). As a breeding feed, special breeding feed (CMF) manufactured by oriental Yeast Co., Ltd. was freely given together with tap water.

Figure 6:
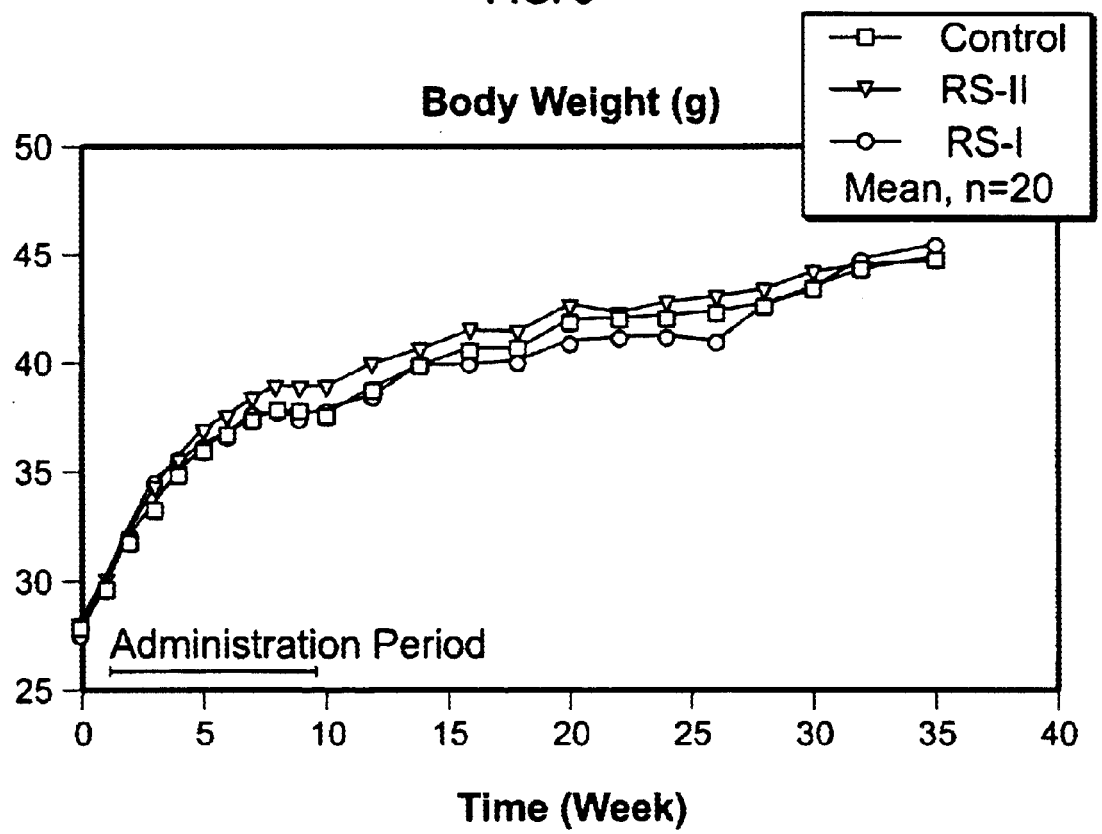
FIG. 6 shows the change of body weight of test mice.

At 5 weeks, the mice were divided into three groups (each group of 20 mice) as set forth in Table 3 so that the mean and variation of body weights was identical (FIG. 6). As shown in Table 3, three groups consisted of RS-II administered group, RS-I administered group and control group, which were administered at the respective amounts as shown. A solution of DMH was intraperitoneally injected into the mice at 20 mg per body weight, once a week, for 10 weeks. The control group was given only CMF.

TABLE 3

| Group | Amount administered (%) | Number of mice |
|---|---|---|
| Control | — | 20 |
| RS-II | 3 | 20 |
| RS-I | 5 | 20 |

Said three groups of mice were observed for colic polyps at 35 weeks after DMH administration (at 40 weeks old).

(2) Results

Figure 7A:
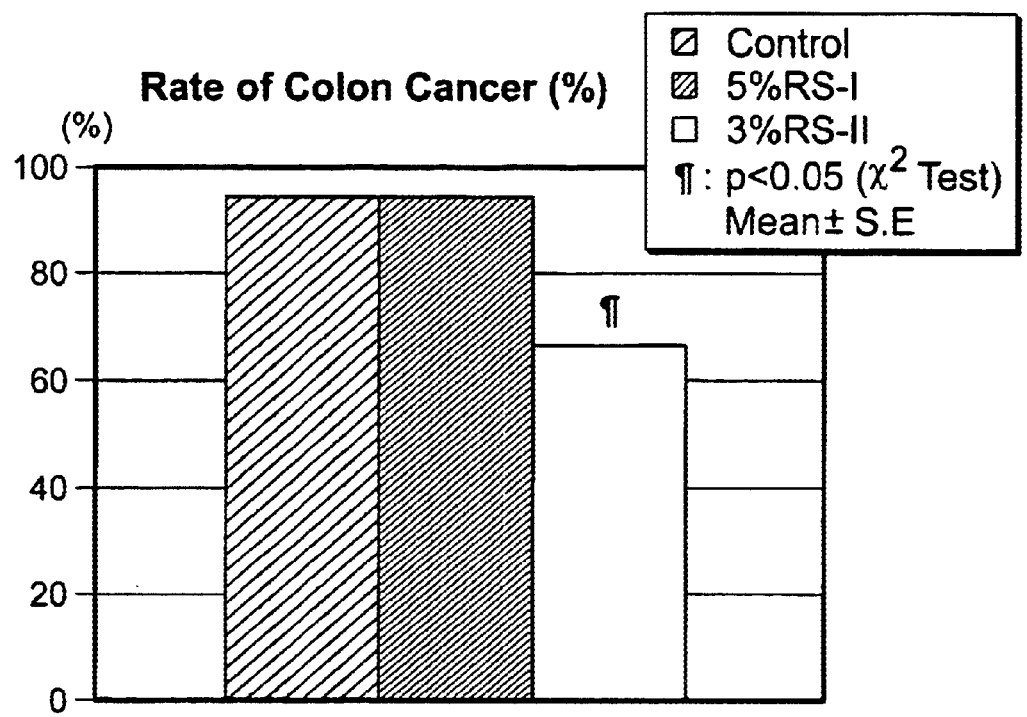
FIG. 7 shows the carcinogenesis inhibiting activity of the composition according to the present invention.

Incidence of polyp was 94% in the control group but 65% in RS-II administration group; thus, the administration group showed a significantly ($p<0.05$) lower rate as compared with the control group (FIG. 7A). However, RS-I administration group showed a incidence of polyp of 94%; thus, no difference from the control group was observed.

Figure 7B:
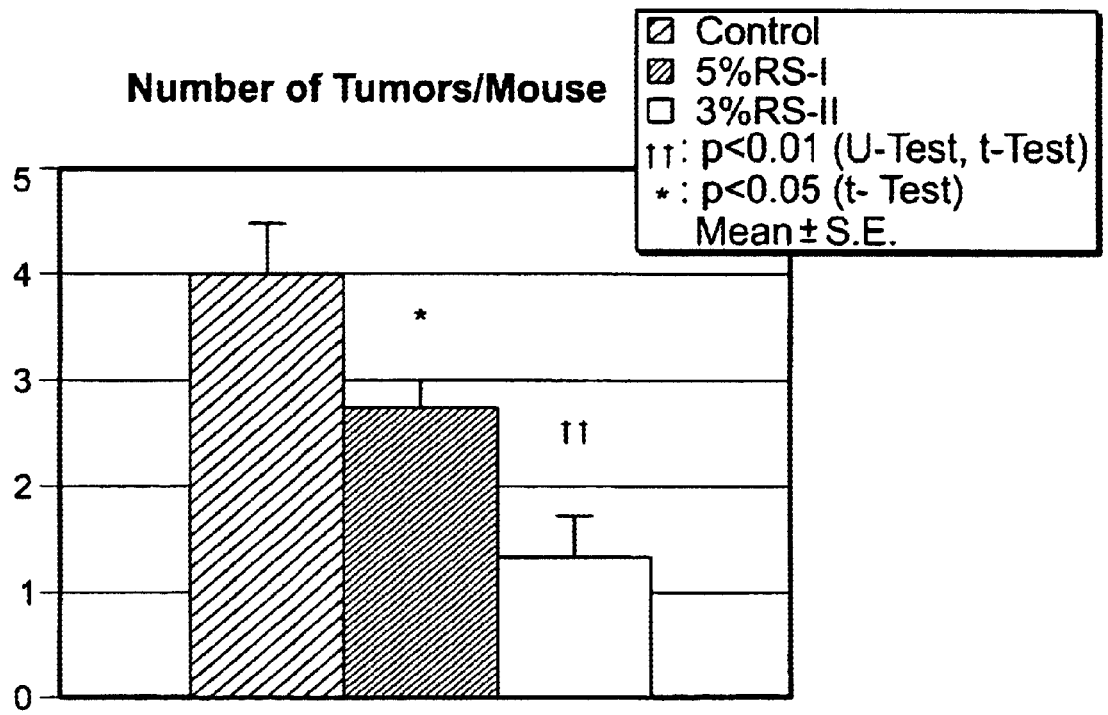

The number of polyps per mouse was 4.0±2.7 (mean ± standard deviation) in the control group and 1.4±1.5 in the RS-II administration group, which was significantly ($p<0.01$) lower than the control group (FIG. 7B). The RS-I administration group showed 2.7±1.9 which was a significantly ($p<0.05$) lower value than the control group (FIG. 7B).

Figure 7C:
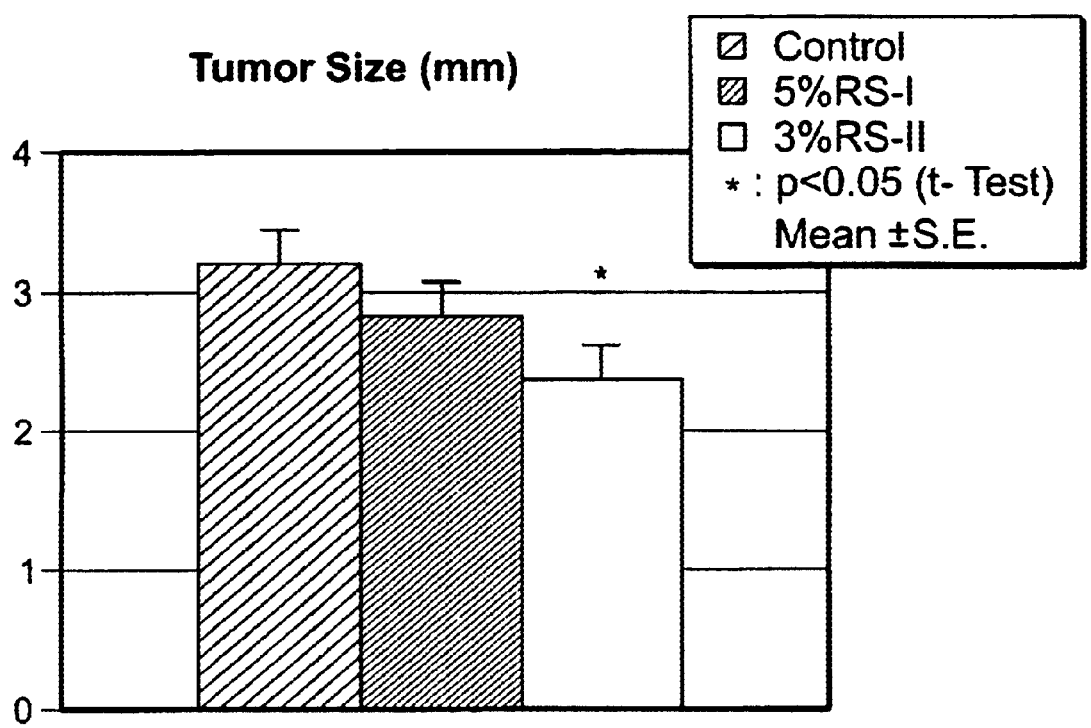

The tumor size was 3.1±1.8 mm in the control group and 2.5±1.3 mm in RS-II administration group; thus, RS-II administration group showed a significantly ($p<0.05$) smaller tumor size than the control group (FIG. 7C).

From the above results, the composition of the present invention was recognized to have carcinogenesis inhibiting effects.

Example 5

Anti-mutagenic Test of Substances Produced by Lactic Acid Bacteria

It is known that most of substances having mutagenesis have carcinogenicity.

Since the results of Example 4 showed that the composition of the present invention prevented colic cancer, it was suggested that the composition of the present invention also had inhibiting effects on mutagenesis.

Thus, the effects of the composition of the present invention on the following mutagenic substances were investigated.

(1) Experimental Method (i) Mutagenic Substances

Each of 4-nitroquinoline-1-oxide (4NQO: 0.25 µg/plate), N-methyl-N'-nitro-N-nitrosoguanidine (MNNG: 0.5 µg/plate), and 3-amino-1-methyl-5H-pyrido(4,3-b) indolacetate (Trp-P-2:5µg/plate) was dissolved in DMSO.

Trp-P-2 is a substance generated upon burning a protein or amino acid, such as burnt fish. MNNG is a substance causing gastric cancer.

(ii) Anti-mutagenic Test

The anti-mutagenic test was carried out by Ames method. The test cell used was *Salmonella typhmurium* strain TA100 (his+). The strain TA100 was cultivated overnight in Nutrient Broth and washed with Na-K buffer. The final concentration of cells in the suspension was adjusted to about $2 \times 10^9$ per ml.

The dried RS-I product was dissolved in sterilized water at each concentration. To a test tube, RS-I solution, 100 µl of a mutagenic substance, 0.5 ml of S9 mix or Na-K buffer, and 0.5 ml of a cell solution to be tested were sequentially added. After reaction at 37° C. for 30 minutes, centrifugation was effected and the supernatant was discarded. A soft agar containing histidine (1 µM) and biotin (1 µM) was added and seeded in a minimal glucose agar medium. This was cultivated at 37° C. and the number of colonies was counted after 2 or 3 days.

(2) Results

Figure 8A:
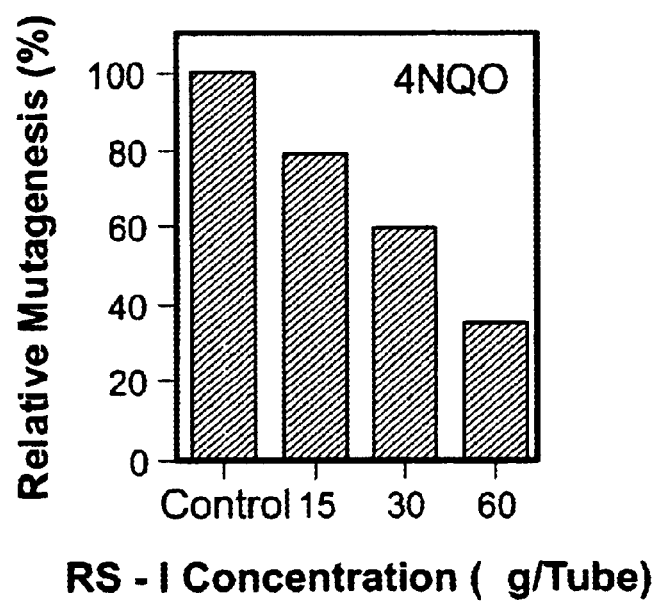
FIG. 8 shows the anti-mutagenic activity of the composition according to the present invention.
Figure 8B:
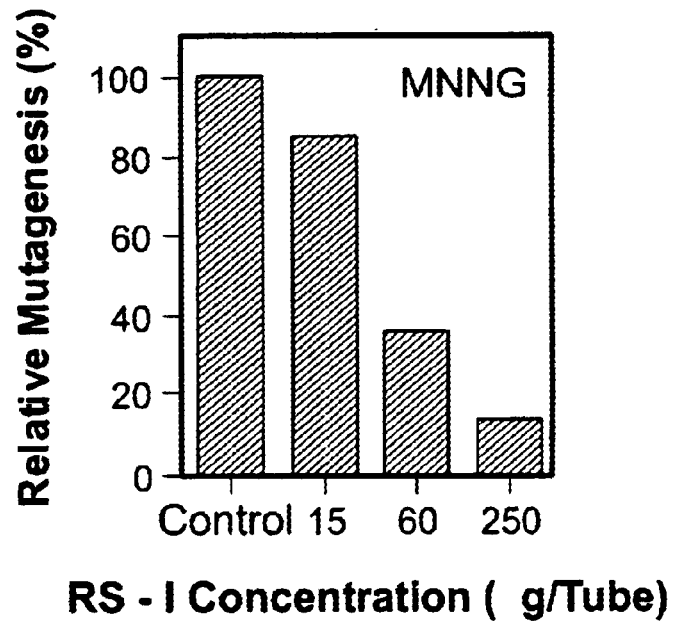
Figure 8C:
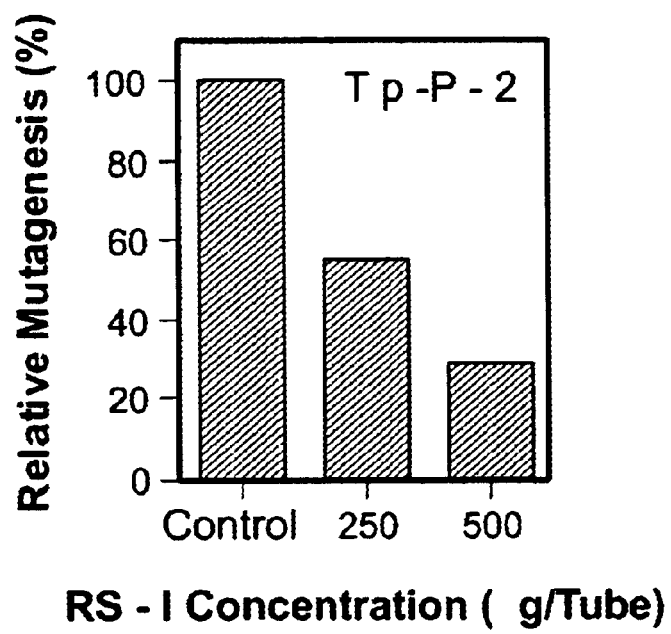

The mutation inhibition was 64% in 4NQO at RS-I concentration of 0.06 mg/plate, 86% in MNNG at RS-I concentration of 0.25 mg/plate, and 72% in Trp-P-2 at RS-I concentration of 0.5 mg/plate (FIG. 8). DMH, Benzopyrene (BP) and DCA were tested up to a concentration of 20 lg/plate, 20 µg/plate and 0.5 µg/plate, respectively, but no mutagenesis of strain TA100 by these substances occurred. Thus, no inhibiting rate of RS-I was detected.

From the above results, it was found that the composition of the present invention had an anti-mutagenic activity against 4NQO, MNNG and Trp-P-2.

Example 6

Intestinal Flora Improving Activity

This example was done to test the intestinal bacterial flora improving activity of the composition according to the present invention contributing to enhancement of human health by improving human intestinal bacterial flora, that is, by increasing the number of beneficial bacteria including Bifidobacterium and Lactobacillus in intestines while inhibiting the growth of harmful bacteria such as *Escherichia coli*.

(1) Experimental Method (i) Investigation of Antibacterial Properties in Liquid Media The media used were a medium containing Brain-Heart infusion (Difco) and ABCM medium (Eiken) for aerobic bacteria and GAM medium (Nissui Seiyaku) or Hemine-menadione added GAM medium and ABCM medium for anaerobic bacteria. The medium was distributed into small test tubes in each 2 ml and the RS-I dissolved in the same medium was added at a concentration of 1% (w/v).

A cell solution containing a given pre-cultivated cell (Table 4) was diluted to a final concentration of $1 \times 10^5$ per ml, added to the above medium and cultivated at 37° C. for 18 to 24 hours. Absorbance at 655 nm was measured using Microplate Reader (Bio-Rad, Model 3550) and the thus measured turbidity was expressed as a relative value to that of the control (100) and represents the growth rate.

(2) Results

As seen from the results in Table 4, the composition of the present invention showed growth promoting activity on the beneficial bacteria such as Bifidobacterium and Lactobacillus at a concentration of 1% (Table 4, upper part). On the other hand, the activity of inhibiting the growth of the harmful bacteria such as *Escherichia coli* and Bacteroides was observed (Table 4, lower part).

TABLE 4

| Strain | Growth ratio (%) |
| --- | --- |
| Bifidobacterium longum E1946 | 206 |
| Bifidobacterium infantis 12 | 187 |
| Bifidobacterium bifidum 560 | 132 |
| Lactobacillus plantarum JCM1149 | 360 |
| Lactobacillus acidophilus I-65 | 118 |
| Lactobacillus reuteri JCM1112 | 302 |
| Escherichia coli 123 | 58 |
| Staphylococcus aureus JCM2413 | 31 |
| Streptococcus pyogenes JCM5674 | 53 |
| Salmonella typhimurium TA98 | 44 |
| Streptococcus mutans JCM5705 | 49 |
| Clostridium perfringens JCM3816 | 72 |
| Bacteroides coagulans ATCC 29798 | 38 |
| Porphyromonas gingivalis 381 | 53 |

All publications, patents and patent applications cited herein are incorporated herein by reference in their entirety.

Industrial Applicability

According to the present invention, there are provided a composition or an untreated or treated culture of lactic acid bacteria mixed with a yeast and a functional food comprising said composition. Thus, the composition of the present invention may be expected to promote the growth of beneficial bacteria such as Bifidobacterium and Lactobacillus in human intestines and to inhibit the growth of harmful bacterial such as *Escherichia coli* and, accordingly, may contribute to promotion of human health.

What is claimed is:

1. A method for inhibiting increases of serum GOT activity caused by deoxycholic acid (DCA) or galactosamine and of serum GPT activity caused by DCA by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus acidophilus, Lactobacillus rhamnosus* and *Lactococcus lactis* compared to that of a mammalian subject to whom said composition is not administered.

2. A method for inhibiting increases of serum GOT activity caused by deoxycholic acid (DCA) or galactosamine and of serum GPT activity caused by DCA by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus plantarum, Lactobacillus casei* and *Streptococcus thermophilus* compared to that of a mammalian subject to whom said composition is not administered.

3. A method for inhibiting increases of serum GOT activity caused by deoxycholic acid (DCA) or galactosamine and of serum GPT activity caused by DCA by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus rhamnosus, Streptococcus thermophilus* and *Lactobacillus fermentum* compared to that of a mammalian subject to whom said composition is not administered.

4. A method for inhibiting increases of serum GOT activity caused by deoxycholic acid (DCA) or galactosamine and of serum GPT activity caused by DCA by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus delbrueckii, Lactobacillus acidophilus, Lactobacillus plantarum, Lactobacillus casei, Lactobacillus rhamnosus, Lactococcus lactis, Streptococcus thermophilus*, and *Lactobacillus fermentum* compared to that of a mammalian subject to whom said composition is not administered.

5. A method for lowering the serum BUN value and increasing the amount of urine excreted upon load of DCA, by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus acidophilus, Lactobacillus rhamnosus*, and *Lactococcus lactis*, compared to that of a mammalian subject to whom said composition is not administered.

6. A method for lowering the serum BUN value and increasing the amount of urine excreted upon load of DCA, by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus plantarum, Lactobacillus casei*, and *Streptococcus thermophilus*, compared to that of a mammalian subject to whom said composition is not administered.

7. A method for lowering the serum BUN value and increasing the amount of urine excreted upon load of DCA, by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus rhamnosus, Streptococcus thermophilus*, and *Lactobacillus fermentum*, compared to that of a mammalian subject to whom said composition is not administered.

8. A method for lowering the serum BUN value and increasing the amount of urine excreted upon load of DCA, by administrating a composition to a mammalian subject comprising a freeze-dried or spray-dried supernatant separated from a mixed culture of microorganisms, wherein the microorganisms consist of lactic acid bacteria and *Saccharomyces cerevisiae*, wherein the lactic acid bacterial consists of *Lactobacillus delbrueckii, Lactobacillus acidophilus, Lactobacillus plantarum, Lactobacillus casei, Lactobacillus rhamnosus, Lactococcus lactis, Streptococcus thermophilus*, and *Lactobacillus fermentum*, compared to that of a mammalian subject to whom said composition is not administered.

9. A composition comprising a freeze-dried or sprayed supernatant separated from a mixed culture of microorganisms, wherein the microorganisms consist of lactic acid bacteria and *Saccharomyces cerevisiae*, wherein the lactic acid bacteria consists of *Lactobacillus acidophilus, Lactobacillus rhamnosus*, and *Lactococcus lactis*.

10. A composition comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus plantarum, Lactobacillus casei*, and *Streptococcus thermophillus*.

11. A composition comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus rhamnosus, Streptococcus thermophilus*, and *Lactobacillus fermentum*.

12. A composition comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus delbrueckii, Lactobacillus acidophilus, Lactobacillus plantarum, Lactobacillus casei, Lactobacillus rhamnosus, Lactococcus lactis, Streptococcus thermophilus*, and *Lactobacillus fermentum*.

13. A composition comprising a freeze-dried or spray-dried supernatant separated from a mixed culture of microorganisms, wherein the microorganisms consist of lactic acid bacteria and *Saccharomyces cerevisiae*, wherein the lactic acid bacteria consists of *Lactobacillus delbrueckii, Lactobacillus acidophilus, Lactobacillus plantarum, Lactobacillus casei, Lactobacillus rhamnosus, Lactococcus lactis, Streptococcus thermophilus*, and *Lactobacillus fermentum*, which are prepared by:
  a) cultivating each of four groups of mixed microorganisms in a hot water extract of soybean, wherein the four groups of mixed microorganisms consist of:
    (1) *Lactobacillus delbrueckii, Lactobacillus casei, Lactococcus lactis* and *Saccharomyces cerevisiae;*
    (2) *Lactobacillus acidophilus, Lactobacillus rhamnosus, Lactococcus lactis* and *Saccharomyces cerevisiae;*
    (3) *Lactobacillus plantarum, Lactobacillus casei, Streptococcus thermophilus* and *Saccharomyces cerevisiae;* and
    (4) *Lactobacillus fermentum, lactobacillus rhamnosus, Streptococcus thermophilus* and *Saccharomyces cerevisiae;*
  b) mixing them together and cultivating to produce a mixed culture of microorganisms,
  c) separating a supernatant from the mixed culture of microorganisms, and
  d) freeze-drying or spray-drying the supernatant.

14. A method for preparation of a composition comprising a freeze-dried or spray-dried supernatant separated from a mixed culture of microorganisms, comprising:
  a) cultivating each of four groups of mixed microorganisms in a hot water extract of soybean, wherein the four groups of mixed microorganisms consist of:
    (1) *Lactobacillus delbrueckii, Lactobacillus casei, Lactococcus lactis* and *Saccharomyces cerevisiae;*
    (2) *Lactobacillus acidophilus, Lactobacillus rhamnosus, Lactococcus lactis* and *Saccharomyces cerevisiae;*
    (3) *Lactobacillus plantarum, Lactobacillus casei, Streptococcus thermophilus* and *Saccharomyces cerevisiae;* and
    (4) *Lactobacillus fermentum, Lactobacillus rhamnosus, Streptococcus thermophilus* and Saccharomyces cerevisiae;
  b) mixing them together and cultivating to produce a mixed culture of microorganisms,
  c) separating a supernatant from the mixed culture of microorganisms, and
  d) freeze-drying or spray-drying the supernatant.

* * * * *